(12) United States Patent
Okoli et al.

(10) Patent No.: US 8,387,469 B2
(45) Date of Patent: Mar. 5, 2013

(54) SYSTEMS, METHODS, AND APPARATUS FOR STRUCTURAL HEALTH MONITORING

(75) Inventors: Okenwa Okoli, Tallahassee, FL (US); Ben Wang, Tallahassee, FL (US); Tarik J. Dickens, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 250 days.

(21) Appl. No.: 12/691,537

(22) Filed: Jan. 21, 2010

(65) Prior Publication Data

US 2010/0181477 A1 Jul. 22, 2010

Related U.S. Application Data

(60) Provisional application No. 61/146,490, filed on Jan. 22, 2009.

(51) Int. Cl.
*G01L 1/24* (2006.01)
*G01J 1/58* (2006.01)

(52) U.S. Cl. ..................... 73/800; 250/227.11

(58) Field of Classification Search ............ 73/768, 73/800, 802; 250/216, 227.11; 252/301.16
See application file for complete search history.

(56) References Cited

U.S. PATENT DOCUMENTS

| | | | |
|---|---|---|---|
| 5,905,260 A | 5/1999 | Sage et al. | |
| 6,581,474 B2 | 6/2003 | Goods et al. | |
| 6,710,328 B1 | 3/2004 | Mastro et al. | |
| 6,820,496 B2 | 11/2004 | McElhanon et al. | |
| 7,270,770 B2 | 9/2007 | Sage et al. | |
| 7,541,509 B2 | 6/2009 | Sigmund et al. | |
| 2008/0248235 A1 | 10/2008 | Feng et al. | |
| 2009/0246507 A1 | 10/2009 | Graham, Jr. et al. | |
| 2010/0102294 A1* | 4/2010 | Jou et al. | 257/13 |
| 2010/0227153 A1* | 9/2010 | Okoli et al. | 428/317.9 |

OTHER PUBLICATIONS

Sage et al., "Triboluminescent damage sensors," Smart Materi. Struct. 8 (1999) pp. 504-510.*
Sage et al., "Getting light through black composites: embedded triboluminescent structural damage sensors," Smart Mater. Struct. 10 (2001) pp. 332-337.*
Kulak et al., "Photoelectrochemical behaviour of TiO2-Modified Carbon-fibre Electrode Assembly," proceedings of the 10th Workshop on Quantum Solar Energy Conversion (1998).*

(Continued)

*Primary Examiner* — Lisa Caputo
*Assistant Examiner* — Punam Roy
(74) *Attorney, Agent, or Firm* — Sutherland Asbill & Brennan LLP

(57) ABSTRACT

Embodiments can provide systems, methods, and apparatus for monitoring the structural health of one or more structures and associated materials. For example, a structural health monitoring system can be provided. The system can include a structure to be monitored, the structure including a material with multiple triboluminescent sensors and multiple nano-optoelectronic members; and an analyzer in signal communication with the nano-optoelectronic members.

21 Claims, 9 Drawing Sheets

OTHER PUBLICATIONS

Burda, Clemens, et al.; "Enhanced Nitrogen Doping in TiO2 Nanoparticles," Nano Letters 2003, vol. 3, No. 8, 1048-1051;May 22, 2003.

Yang, Yaodong, et al.; "Electrophoresis Coating of Titanium Dioxide on Aligned Carbon Nanotubes for Controlled Synthesis of Photoelectric Nanomaterials," Advanced Materials 2007, 19, 1239-1243; Sep. 25, 2006.

Holgate, Sharon Ann; "Glowing Report," New Scientist, Issue 2204; Sep. 18, 1999.

Okafor, A.C., et al.; "Detection and Characterization of high-velocity impact damage in advanced composite plates using multi-sensing techniques," Elsevier: Composite Structures 54 (2001) 289-297; 2001.

Walton, Alan J.; "Triboluminescence," Advances in Physics, vol. 26, No. 6, 887-948; Jul. 20, 1977.

Bourhill, G.; "The solid state photoluminescent quantum yield of triboluminescent materials," Chemical Physical Letters 336 (2001) 234-241.

Dickens, Tarik, et al., "Harnessing Triboluminescence for Structural Health Monitoring of Composite Structures," High Performance Materials Institute, Florida A&M University—Florida State University; May 20, 2008.

Lee, Sung-Hwan, "Photocatalytic Nanocomposites Based on TiO2 and Carbon Nanotubes," The Graduate School of the University of Florida; 2004.

Watkins, Neal A., et al., "Single Wall Carbon Nanotube-Based Structural Health Sensing Materials," NASA Langley Research Center; NSTI-Nanotech 2004, www.nsti.org, ISBN 0-9728422-9-2, vol. 3, 2004.

* cited by examiner

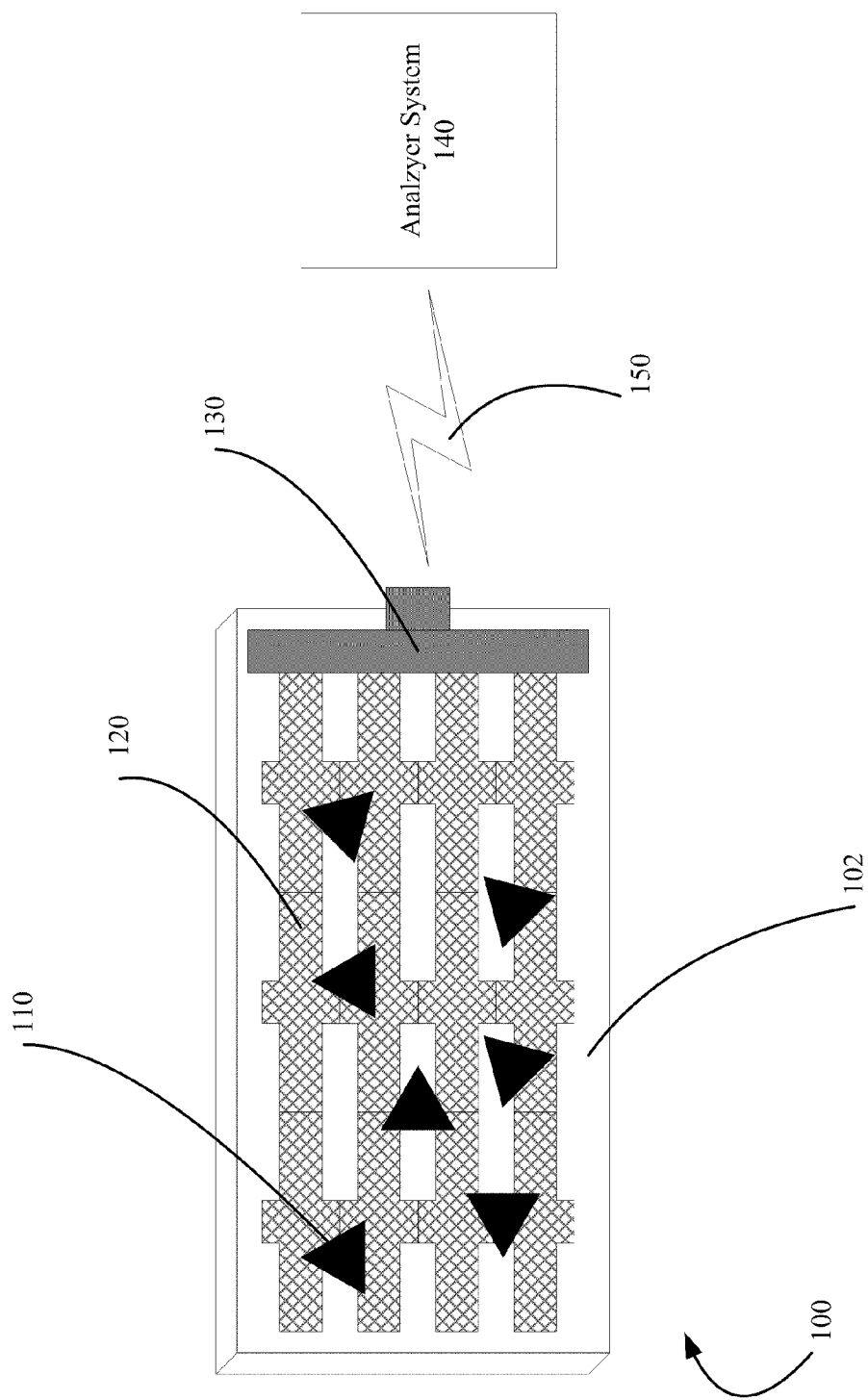

SYSTEMS, METHODS, AND APPARATUS FOR STRUCTURAL HEALTH MONITORING

RELATED APPLICATIONS

The present application claims the benefit of U.S. Provisional Patent Application Ser. No. 61/146,490 filed Jan. 22, 2009, which is hereby incorporated by reference as if set forth fully herein.

FIELD OF THE INVENTION

Embodiments of the invention relate generally to structural monitoring, and more particularly to systems, methods, and apparatus for structural health monitoring.

BACKGROUND OF THE INVENTION

Structural health monitoring (SHM) of safety critical components is used to facilitate life-cycle management decisions. As design and functionality requirements of engineering structures become more complex, SHM and damage assessment is becoming a rigorous obligation. As one example, the aerospace industry has one of the highest returns for SHM since damage can lead to catastrophic and expensive failures, which in turn causes aircraft vehicles to undergo regular costly inspections. Roughly, one-third of an aircraft's life-cycle cost can be spent on inspection and repair, a figure that excludes any additional opportunity cost associated with the time the aircraft is grounded for inspection and/or repair. Many advances in SHM concentrate on modern, non-destructive inspection devices that provide off-line inspection capabilities requiring structures to be taken out of service for critical inspection. It is, therefore, desirable that damage detection in critical structures be swift, reliable, and cost-effective.

Thus, there exists a need for systems, methods, and apparatus providing structural monitoring.

SUMMARY OF THE INVENTION

Embodiments can provide systems, methods, and apparatus for monitoring the structural health of one or more structures and associated materials. According to one embodiment, a method for monitoring the structural health of a structure is provided. The method can include: providing a structure including a material having multiple triboluminescent sensors and multiple nano-optoelectronic members, wherein the nano-optoelectronic members are operable to convert light energy emitted from proximate triboluminescent sensors into one or more electrical signals; providing at least one analyzer in signal communication with one or more of the nano-optoelectronic members; and receiving at least one electrical signal at the analyzer from one or more of the nano-optoelectronic members, wherein the at least one electrical signal is converted by the nano-optoelectronic members from light energy emitted from one or more proximate triboluminescent sensors.

According to another embodiment, a structural health monitoring system is provided. The system can include a structure to be monitored, the structure including a material with multiple triboluminescent sensors and multiple nano-optoelectronic members, and an analyzer in signal communication with the nano-optoelectronic members.

According to yet another embodiment, a structure capable of being monitored is provided. The structure can include multiple triboluminescent sensors embedded in a material and multiple nano-optoelectronic members embedded in the material. The nano-optoelectronic members can be operable to convert light energy emitted from respective triboluminescent sensors into electrical signals. The nano-optoelectronic members may also be operable for signal communication with an analyzer.

Additional systems, methods, apparatus, features, and aspects are realized through the techniques of various embodiments described herein. Other embodiments and aspects are described in detail herein and are considered a part of that disclosed, and other features will be understood with reference to the description and to the drawings.

BRIEF DESCRIPTION OF THE DRAWINGS

Figure 1B:
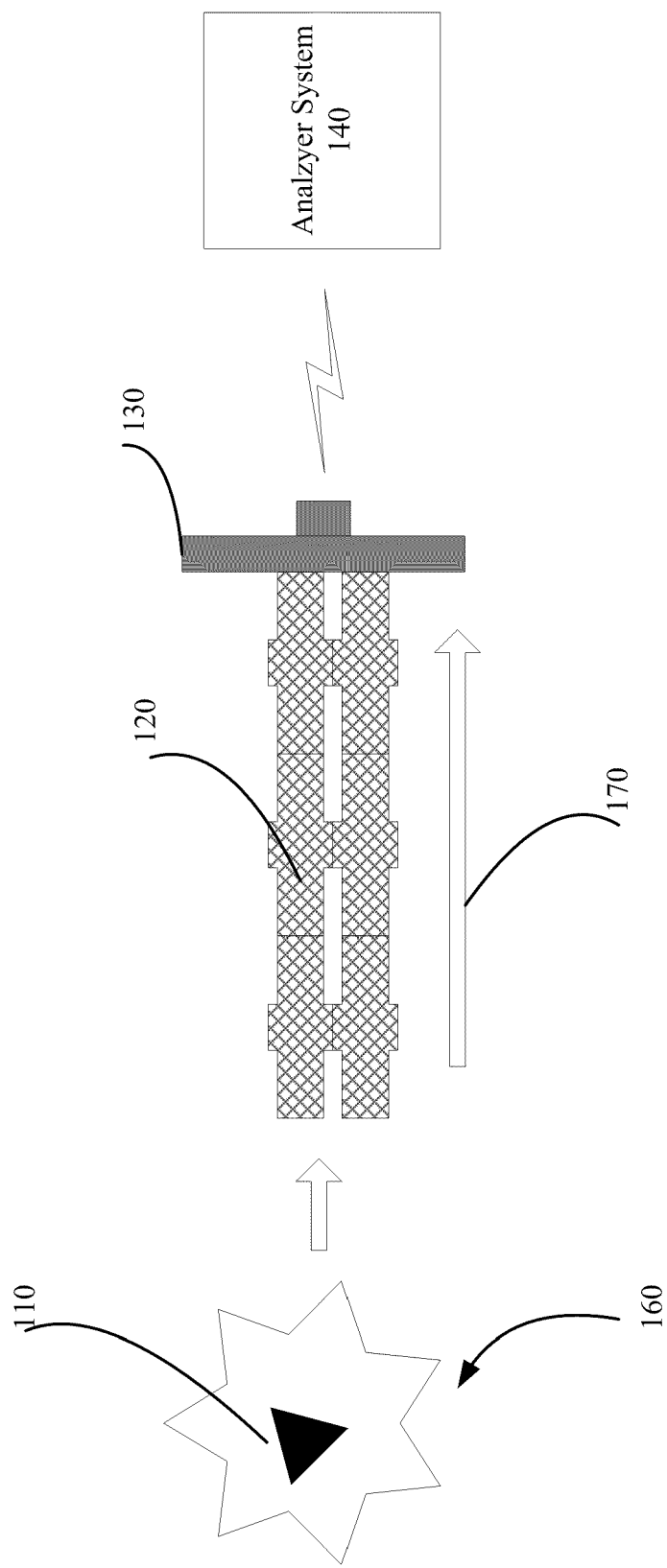

Having thus described the invention in general terms, reference will now be made to the accompanying drawings, which are not necessarily drawn to scale, and wherein:

FIGS. 1A-1B illustrate a diagrammatic graphical representation of components of a structural health monitoring system, according to one embodiment.

Figure 2:
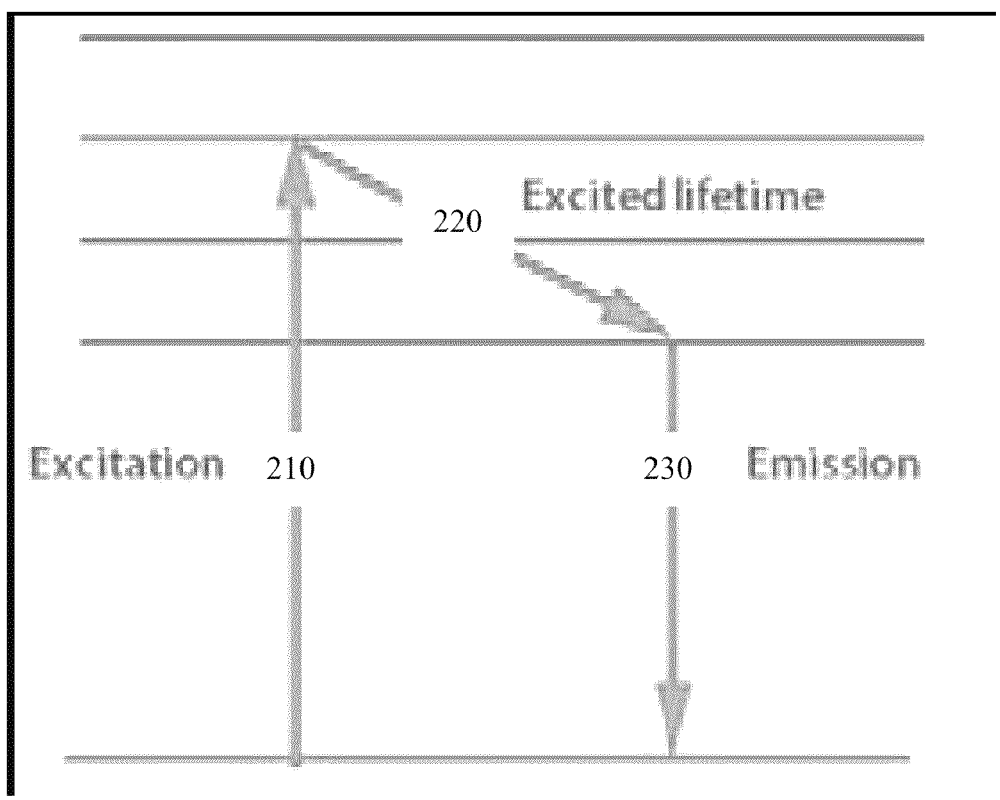

FIG. 2 illustrates a diagrammatic representation of energy level changes through which particles undergo when emitting light energy.

Figure 3:
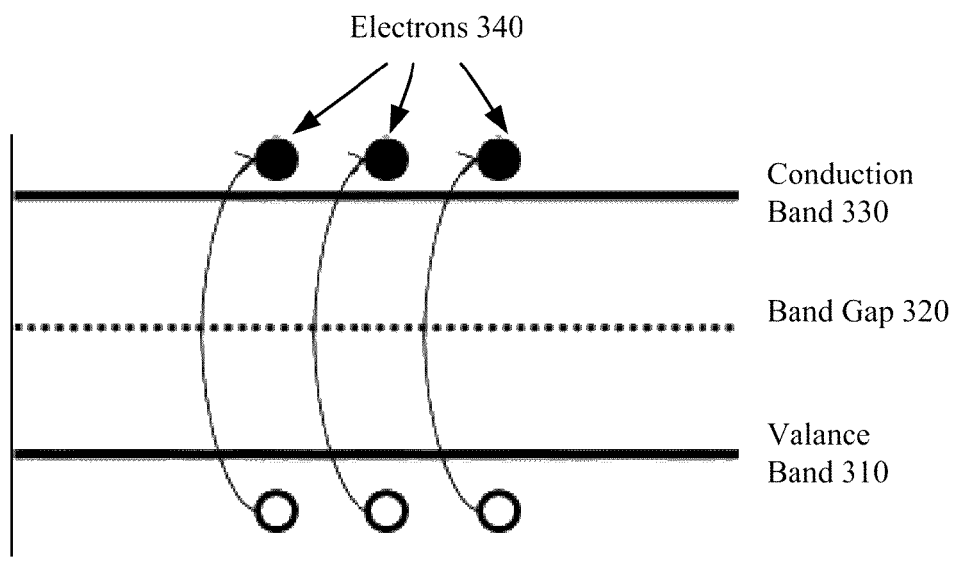

FIG. 3 illustrates a diagrammatic representation of an energy band for an example particle.

Figure 4A:
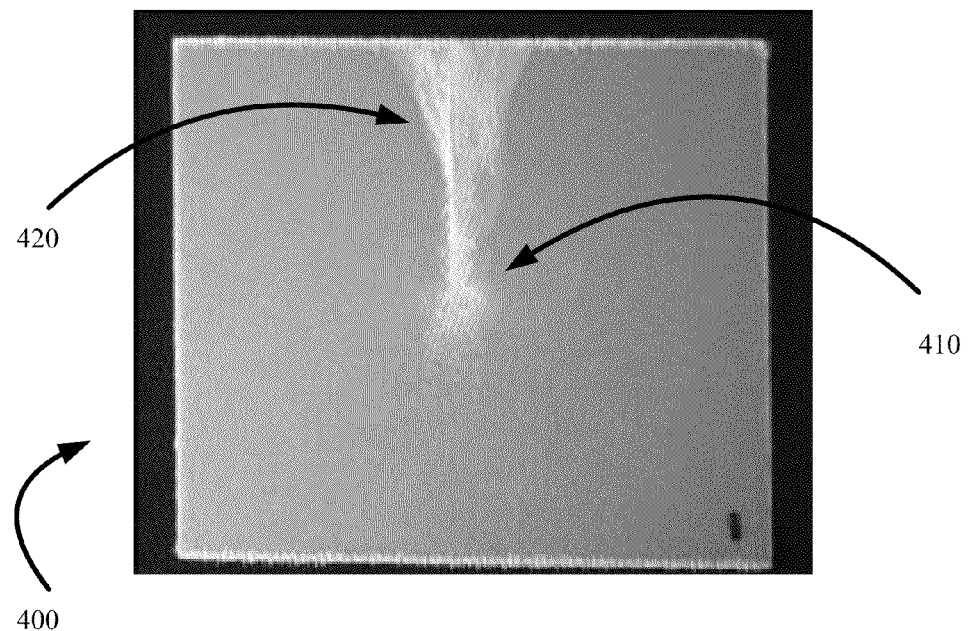
Figure 4B:
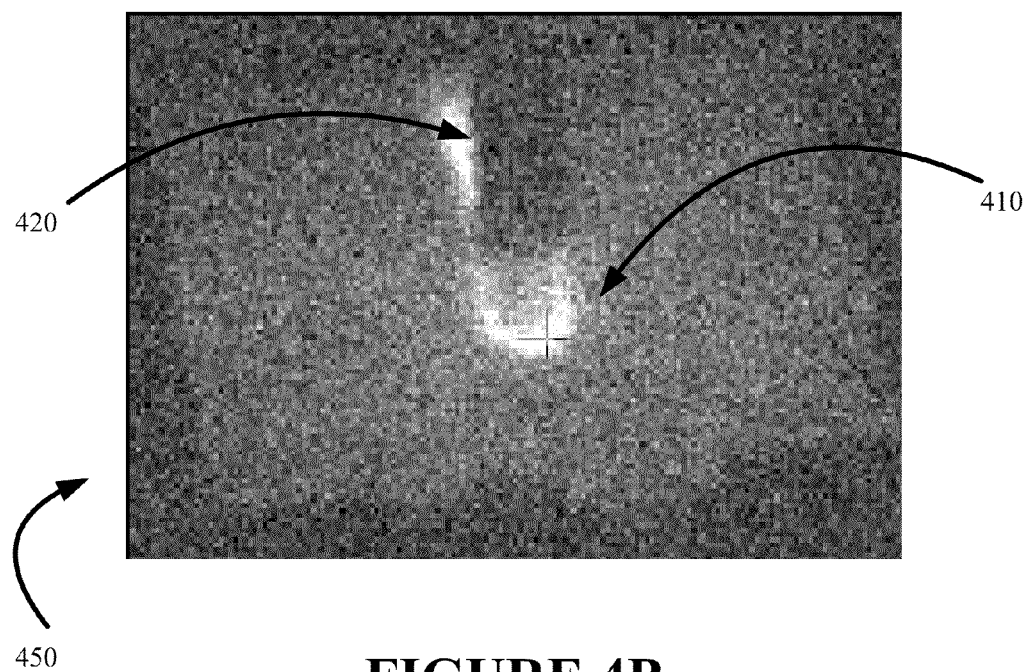

FIGS. 4A-4B illustrate light emissions of a structure resulting from structural failure.

Figure 5:
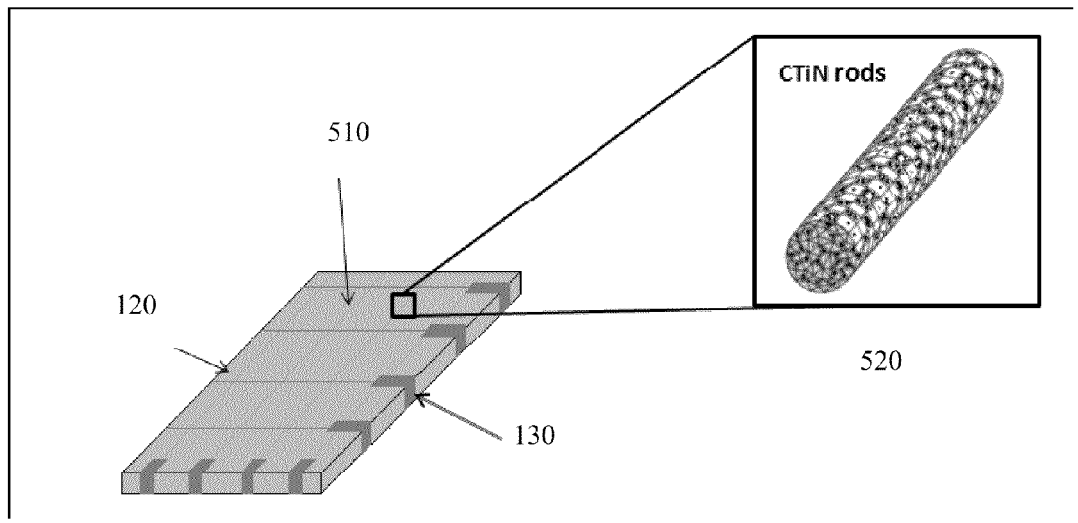

FIG. 5 illustrates a diagrammatic representation of a material component operable for structural health monitoring, according to one embodiment.

Figure 6:
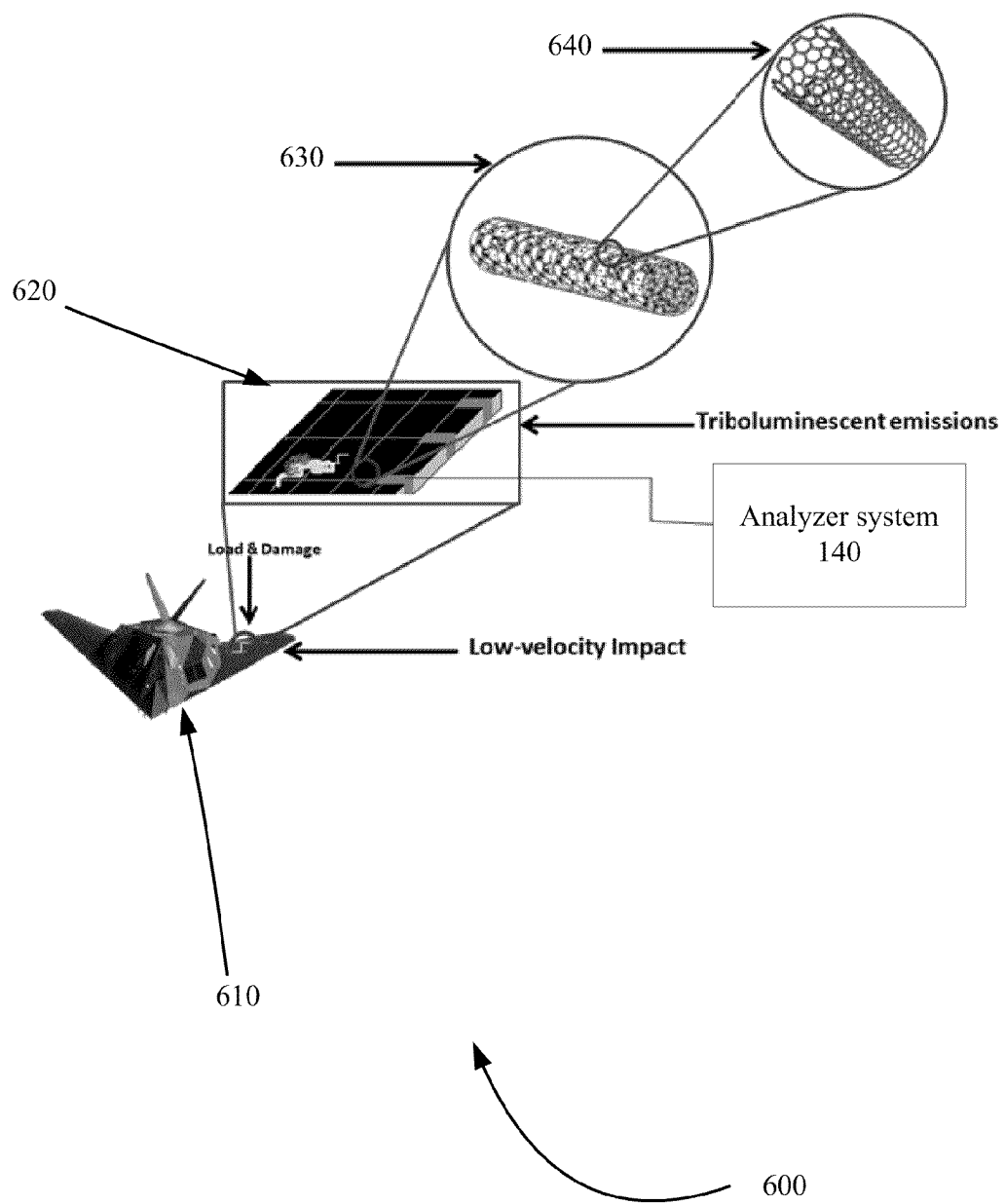

FIG. 6 illustrates a diagrammatic representation of a structure to be monitored, according to one embodiment.

Figure 7:
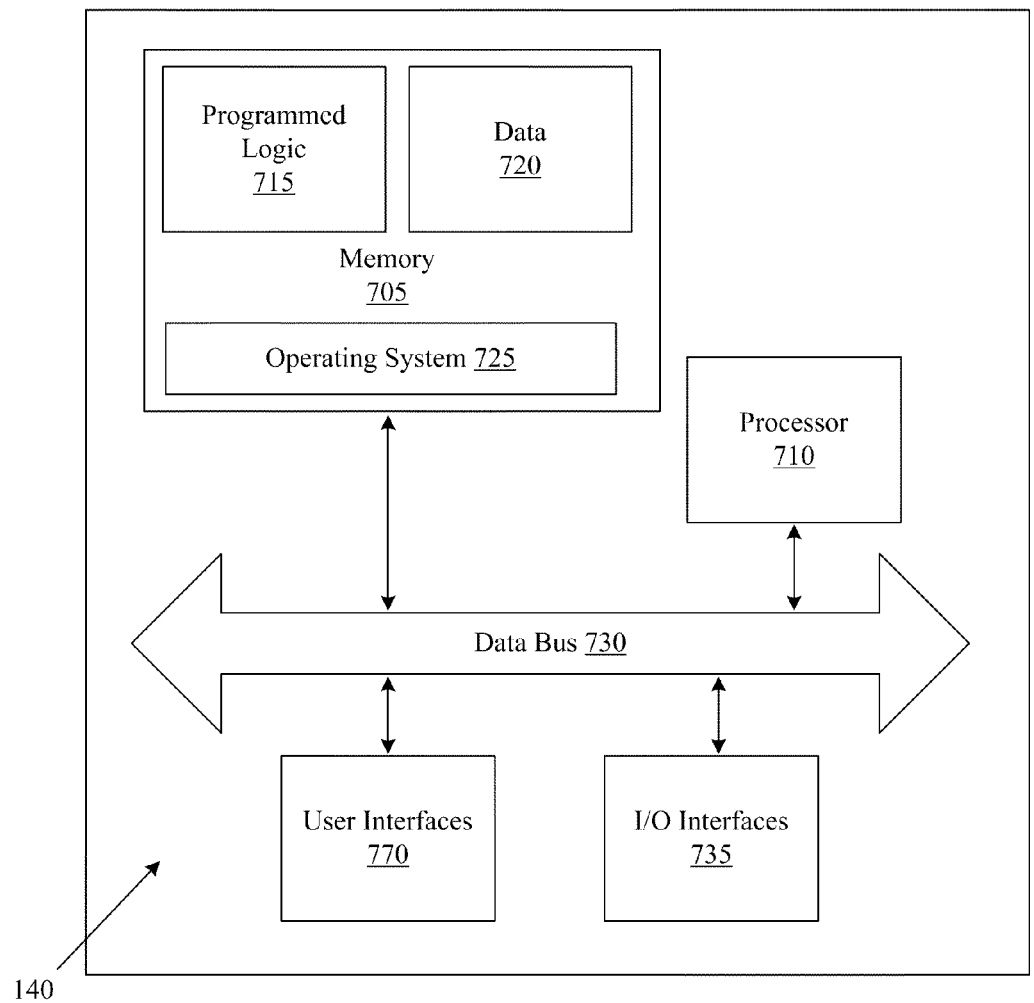

FIG. 7. illustrates a block diagram of an analyzer system, according to one embodiment.

Figure 8:
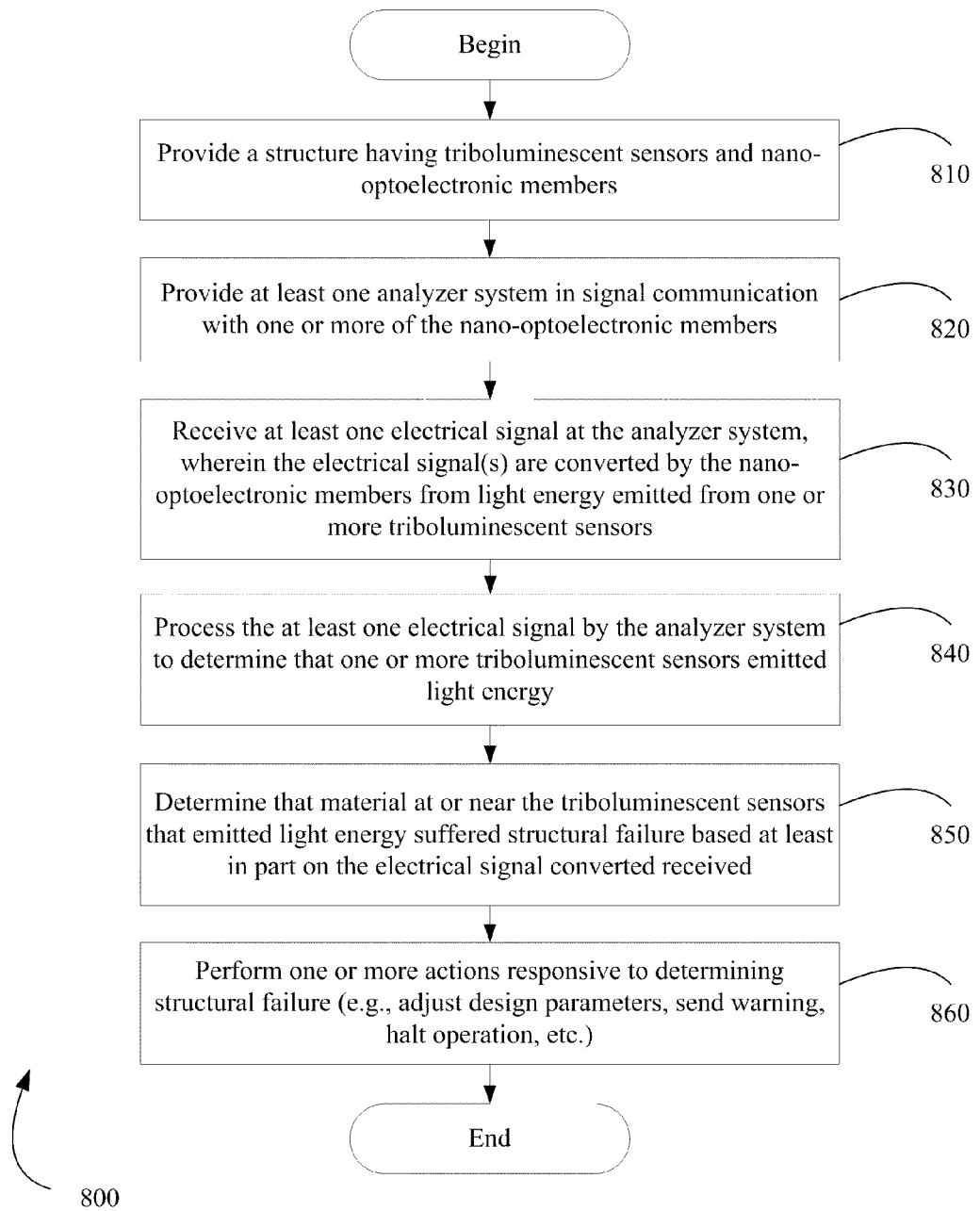

FIG. 8 illustrates an example method for monitoring structural health of a structure, according to one embodiment.

DETAILED DESCRIPTION OF THE INVENTION

Example embodiments will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments described herein provide improved structural health monitoring systems that allow for online monitoring and minimize the need to remove a structure from operation solely for the purpose of monitoring the health and integrity of the structure. As described above, many current methods require removing a structure from service to evaluate the structure's integrity, and utilizing techniques such as ultrasonic testing, acoustic emissions testing, x-ray tomography testing, and the like. Each of these conventional evaluation techniques include labor-intensive manual processes and take time to perform, which in turn has increased costs and associated opportunity costs due to lost time from operation.

In addition, composites are particularly difficult to evaluate because many degradations or other integrity issues, such as cracking or delamination, occur from within the composite structure and are not outwardly apparent. For example, detecting a low velocity impact (e.g., a bird strike) to an aircraft's composite body can be challenging, since, at these velocities, the impact damage may not be readily visible on the surface. Damage initiation and propagation in structures can begin at the microstructural level and may go undetected by conventional external or surface monitoring systems. As a result, material degradation can occur due to continuous usage. Undetected damage can result in a reduction of mechanical properties of the structure and subsequent failure. Accordingly, it is desirable to identify the location of damage and severity at the microstructural levels as an indicator to avoid macroscopic fatigue, failure, and possible catastrophic events.

Accordingly, embodiments of the structural health monitoring system described herein include using triboluminescent (TL) sensors (also referred to herein as "TL crystals") and photocatalytic transport means to facilitate structural health monitoring, and may generally be referred to as a "Triboluminescence and Photocatalysis system," a "TriP system," or a "TriP structural health monitoring system." As described below, triboluminescence is the phenomenon of light being generated as a result of a fracture or breaking of bonds in a TL sensor. This light can be monitored to identify when forces are applied to a structure being monitored. Thus, using TL sensors and photocatalytic means to detect and transport light energy, a TriP structural health monitoring system can facilitate real-time, or near real-time, detection of crack initiation and growth, or detection of other structural defects or degradations, at a given structure's material level.

According to various embodiments, a TriP system can include one or more TL sensors dispersed within a material of the structure to be monitored and a transport mechanism operable to communicate signals representing TL sensor luminescent activities to one or more analyzer systems. According to various embodiments, a transport mechanism may be formed from one or more nano-optoelectronic members, such as, but not limited to, carbon nanotubes, carbon nanofibers, carbon nanofilm, glass fibers, Kevlar fibers, and the like, having photocatalytic capabilities. The photocatalytic properties allow nano-optoelectronic members to convert light energy to electrical energy, as described in more detail herein. Nano-optoelectronic members also operate as an electrical conductor. Accordingly, nano-optoelectronic members serve as energy conversion and signal communication means for converting TL sensor luminescence to electrical energy and then transmitting the representative electrical signals for ultimate delivery to an analyzer system.

In use, TL sensors embedded in a structure's material will emit light when impacted. The photocatalytic properties of one or more nano-optoelectronic members proximate the impacted TL sensor or sensors will convert the light energy to electrical energy and conduct the generated electrical current to one or more terminal nodes, which reside near the edge of the structure and/or material being monitored. The one or more terminal nodes provide communication, whether it be wired or wireless, between the nano-optoelectronic members and an analyzer system. The analyzer system in turn analyzes the transmitted electrical signal, which is representative of the light intensity of the TL crystals, to determine the severity of the impact, an approximate location, and whether the health of the structure is jeopardized.

A TriP structural health monitoring system provides a vast improvement, even a paradigm-shift, in the way sensors can be designed, installed, and utilized for structural health monitoring. The system permits the health and condition of monitored structures to be more completely assessed as they age. Moreover, using a TriP structural health monitoring system allows for new material types and/or structures, when incorporated into future products, to be both well understood and be effectively monitored over the life of those structures. In embodiments described herein, a TriP structural health monitoring system integrates the two unique technologies of triboluminescence and photocatalysis advantageously combined with nanotechnology.

Accordingly, embodiments of a TriP structural health monitoring system can provide a system and structure capable of being closely monitored that can include TL sensors fully and evenly dispersed within the matrix material. The TriP system is capable of monitoring any or all of an entire structure, and provides a system that indicates structure failure, crack initiation, deformation, fragmentation, delamination, and the like, well in advance of catastrophic failure. This is unlike conventional structural health monitoring systems, which can only detect manual selected points of interest requiring whole surface scans to detect damage that has already taken place.

A TriP structural health monitoring system presents great value by providing integrated health monitoring systems for space, energy, aerospace, transportation, construction, and defense applications with real-time online capabilities.

Embodiments of systems, methods, and apparatus for structural health monitoring will now be described in detail with reference to FIGS. 1-8.

With reference to FIGS. 1A-1B, components of a structural health monitoring system, according to one embodiment, are represented via a diagrammatic graphical illustration. FIG. 1A illustrates a structural health monitoring system 100 for monitoring the structural health of a structure 102. The structural health monitoring system 100 of this embodiment includes multiple TL sensors 110, multiple nano-optoelectronic members 120, one or more terminal nodes 130, and an analyzer system 140.

The structure 102 may be any structure made from at least one material that is desired to be monitored, and which is capable of having TL sensors 110 and nano-optoelectronic members 120 deposited therein and/or thereon. Example structures may be formed from any number of materials capable of applying a structural health monitoring system 100, including, but not limited to, composite-based structures, such as aircraft bodies, boat hulls, or other vehicle bodies or other components; concrete structures formed from poured concrete or other mixture, such as roads, buildings, reservoirs, pipes, wells, or other foundation and/or support structures; metal-based structures formed from metal or metal-alloy materials, such as framing, structural supports, or other building supports, or body panels; non-composite polymer-based structures; and the like. Example composite materials include, but are not limited to, fiber matrix composites, in particle matrix sit composites, reinforcement-plus-filler hybrid composites, fiber-plus-particle hybrid composites, composite laminates, or any combinations thereof. In other examples, a structural health monitoring system can also be used with repaired areas of existing structures, such as by embedding and/or coating components in areas of a structure that have previously shown signs of distress. It is further appreciated that a structural health monitoring system may be used with any number of types of structures, and the aforementioned structure and/or material types are provided for illustrative purposes and are not intended to be limiting. Accordingly, as used herein, the term "structure" generally refers to any item being monitored by a structural health monitoring system, and is not limited to specific materials, composites, products, or structures described by example herein. The structure 102 represented in FIG. 1A is illustrated as an abstract partial view of any structure, which may be formed from any material.

The structural health monitoring system 100 also includes TL sensors 110, which are shown as being dispersed through a material from which the structure 102 is formed. For example, if the material is a composite material, the TL sensors 110 can be dispersed within one or more resin layers or other fillers used when forming the composite, according to one embodiment. In another example, the TL sensors 110 can be combined with reinforcing material (e.g., fiber matrix, etc.) used when forming a composite. The concentration and distribution of TL sensors 110 within the material may differ, depending upon the intended use of the material and the anticipated strains that will be encountered. For example, the TL sensors 110 can be distributed homogeneously or non-homogeneously through a material. A non-homogeneous distribution may be used to concentrate TL sensors 110 near certain strike zones or known areas of the structure likely to undergo stress or failure. In one experiment, tests were conducted that involved low velocity impacts of glass fiber reinforced composite laminates constructed as a 5-ply composite with TL crystals dispersed at approximately a 6% concentration in a test environment. The tests indicated acceptable luminescence along a path of delamination caused by the low velocity impacts; however, in other embodiments, the concentration of TL sensors 110 may be greater than or less than the concentration tested. Photographs and spectral images captured during these tests are shown in FIGS. 4A-4B.

In another embodiment, TL sensors 110 may coat, or otherwise be adhered to, the nano-optoelectronic members 120 themselves. Upon combining multiple TL sensors 110 with multiple nano-optoelectronic members 120, the nano-optoelectronic members 120 can be dispersed within the material (e.g., a composite, etc.) in any manner known. Moreover, in one embodiment, TL sensors 110 can be independently dispersed within the material in addition to the nano-optoelectronic members 120 combined with TL sensors 110.

Although the aforementioned examples describe TL sensors 110 (and the nano-optoelectronic members 120 described in more detail below) as being dispersed within a material, such as a composite material, TL sensors 110 (and nano-optoelectronic members 120) can also be adhered to the surface of a structure by being dispersed within a coating material (e.g., paint, clear coating, polymer coating, etc.), which is then used to coat all or part of the structure to be monitored, according to another embodiment.

A more detailed description of triboluminescence is provided with reference to FIG. 2, which illustrates a diagrammatic representation of energy level changes that TL particles undergo when emitting light energy. Triboluminescence is the phenomenon of light being generated as a result of a fracture or breaking of bonds in a given material. Luminescence of any form is derived from energy accretion on a molecular scale. Light itself is a form of energy made up of photons, and the emission of light from a source of energy is called "luminescence." According to Bohr's model, electrons that accompany differing energy levels around the nucleus of an atom are given action on impact. Bohr's model explains the nature of particles and their subsequent atoms, where each atom is made up of protons, electrons, and neutrons. In this model, the nucleus is located at the ground state and requires certain energies to propel it to rise to higher energy levels. Upon impact, particles absorb the energy needed to ascend energy levels from low to high and back down. The movement of these particles through the energy levels produces the charge required for illumination as shown in the diagram of FIG. 2.

Light is emitted when particles lose energy by descending through lower energy levels. As depicted in FIG. 2, electrons become excited when an external energy source strikes the TL sensor material (illustrated as stage 210). However, since this excited state is unstable, energy levels decrease to a more stable state during the excited lifetime (illustrated as stage 220). Emission of light results when particles lose energy by descending through lower energy levels to their original (ground) state (illustrated as stage 230).

According to some embodiments, the TL sensors 110 dispersed within the material monitored are TL crystals, which may include, but are not limited to, Zinc sulfide, Zinc sulfide manganese, manganese, Terbium-based complexes, Europium-based complexes, Samarium complexes, Barium (e.g., $BaAl_2Si_2O_8$), and the like. For use in structural health monitoring, TL sensor materials ideally exhibit some or all of the following properties: sufficient luminescence, high temperature stability, high melting point, compatibility with structural material (e.g., compatibility with composite matrix and/or resins, etc.), and light emissions at wavelengths different from those provided by known or anticipated materials. According to various example embodiments, TL crystals may range in size and dimension, such as between approximately 1 micrometer in diameter to approximately 50 micrometers in diameter, for example, according to one embodiment, a TL crystal diameter may be approximately 5 micrometers. It is appreciated, however, that the aforementioned TL sensor examples and size descriptions are provided for illustrated purposes, and that any number of other TL sensors and/or crystal dimensions that are compatible with the material and/or structure being monitored (e.g., compatible with a composite matrix, etc.) may be used.

With continued reference to FIG. 1A, multiple nano-optoelectronic members 120 are also shown as being dispersed within the material forming the structure 102. For example, in one embodiment, when constructing a composite structure to be monitored, nano-optoelectronic members 120 can be placed within a fiber preform prior to introduction of a TL sensor-doped resin. It is appreciated, however, that, according to various embodiments, nano-optoelectronic members 120 can be placed within, on, under, near, or otherwise in association with the structure 102 being monitored. The nano-optoelectronic members 120 are shown as a woven mesh or mat, which may be accomplished by forming an array, such as an aligned array or random array of elongated rods; however, it is appreciated that, according to other embodiments, the nano-optoelectronic members 120 may be formed in any other manner, including, but not limited to, one or more films, randomly dispersed, side-by-side elongated members, or any combination thereof.

For example, according to one embodiment, the material forming the structure may be a composite-based material in which a first group of nano-optoelectronic members 120 are provided in an array configuration, such as is illustrated in FIG. 1A, and a second group of nano-optoelectronic members are randomly dispersed within a resin. The random dispersion of nano-optoelectronic members serves to improve the conversion and transmittal of light energy from TL sensors 110 by increasing the chances of one or more nano-optoelectronic members being proximate an impacted TL sensor 110. The random dispersion also serves to improve structural strength of the composite material.

According to various embodiments, the nano-optoelectronic members 120 may be formed from rods, films, fibers, or any combination thereof. Nano-optoelectronic members 120 may be carbon-based, such as, but not limited to, carbon nanotubes, which may be single-walled or multiple-walled, carbon nanofibers, or carbon nanofilms. An example carbon nanotube may be a carbon nanotube manufactured by Nanocomp Technologies, Inc. (Concord, N.H.); however, any other carbon nanotube may be used, pre-manufactured or otherwise. In other embodiments, however, nano-optoelectronic members 120 may be formed from other substances, such as, but not limited to, glass fibers, Kevlar fibers, and the like.

Nano-optoelectronic members 120 have conductive properties that will permit transmission of electrical current generated from the luminescence occurring during impact of TL sensors 110. TL sensor 110 luminescence is described above with reference to FIG. 2. Thus, according to one embodiment, the nano-optoelectronic members 120 are further modified to exhibit photocatalytic properties, which convert light energy emitted by the TL sensors 110 to electrical energy for transmission via the nano-optoelectronic members 120. A more detailed description of photocatalysis is provided with reference to FIG. 3, which illustrates a diagrammatic representation of an energy band for an example particle.

Photocatalysis is the accelerated change of a photoreaction brought about by a catalyst. The mechanism surrounding the actions of the photocatalytic abilities are present in the behavior of electrons in the electron shell of an atom. Valence electrons are the electrons in the outermost shell and dictate the relationships individual atoms have while reacting with each other on an atomic scale. Ultimately, the more valence electrons present, the higher attraction or bonding occurs when energies are in a state of continuum. This sum of energies or "energy band" describes the allowed or forbidden bands of an electron. The "forbidden band" is the area between two energy bands where there is no electron energy (also referred to as the "proverbial wall"). The highest ranges of energies where electrons sit are referred to as the "valence band" 310. This valence band 310 is followed by a "band gap" 320, and then by the "conduction band" 330. In the conduction band 330, the higher energy level spaces allow the acceleration of free electrons 340. These states determine the optic and electronic properties of semiconductors. The amount of energy needed to exceed the forbidden band is known as the "band gap energy." At the band gap energy, electrons are allowed to move freely. When electrons remain free, they leave holes in which exterior events can be absorbed to fill these holes, providing they exude the acceptable wavelengths. It is this process by which photocatalysts generate electrical current as a result of light energy generated at certain wavelengths. Irradiation of a conductor having photocatalytic properties by a light energy equal to or greater than the conductor's band gap energy results in the creation of electrons in the conductor's conduction band and, thus, electrical current conduction.

Nano-optoelectronic members 120 can, therefore, be combined with a photocatalyst to generate electrical current from the luminescent activities of TL sensors 110 when strained. Various photocatalysts suitable for use with the nano-optoelectronic members 120 include, but are not limited to, titanium dioxide ($TiO_2$, which is also commonly referred to as "titania"), zinc oxide (ZnO), or magnetite ($Fe_2O_4$). It is appreciated, however, that any other photocatalysts suitable for use with the selected TL sensors 110 and for combining with the selected nano-optoelectronic members 120 can be used.

In one example embodiment, titania is used as the photocatalyst and is combined with the nano-optoelectronic members 120. Titania, however, is a wide bandgap semiconductor that may account primarily for ultraviolet irradiation. Thus, in one embodiment, the optical response of titania is shifted from the ultraviolet range to a visible spectral range, which will increase its effectiveness in converting light energy to electrical current. For example, the bandgap of the anatase phase of titania, which may be approximately 3.2 eV, may be significantly decreased, such as to approximately 1.77 eV to approximately 3.1 eV, to allow for photocatalysis to occur in the visible spectrum. It has been established that doping titania with nitrogen (e.g., $TiO_{2-x}N_x$) makes the combination photocatalytically active with an absorbance extending into the visible spectrum, such as up to approximately 600 nanometers (or any other visible wavelength). A more detailed explanation of an example titania nitrogen doping process via amination is described by Burda et al. (C. Burda, Y. Lou, X. Chen, A. C. S. Samia, J. Stout, J. L. Gole, Enhanced Nitrogen Doping in TiO2 Nanoparticles, Nano Letters, Vol. 3, No. 8, pp. 1049-1051 (2003)).

Leveraging the nitrogen doping processes of Burda allows combination of nitrogen doped titania with nano-optoelectronic members 120, such as carbon nanotubes or other nanofibers. For example, according to one embodiment, nano-optoelectronic members 120 can be functionalized via an acid treatment, which allows functional groups to be formed on the surface of the member and provides a good interfacial region to which titania can adhere. After functionalizing, the nano-optoelectronic members 120 and a titania precursor or end particulate can be synthesized together to generate titania doped nano-optoelectronic members 120, which serves as nano-optoelectronic members 120.

It is appreciated, however, that other processes for altering photocatalyst properties and/or combining photoctalysts with nano-optoelectronic members 120, may include means other than that described with reference to titania (e.g., nitrogen doping as described by Burda, etc.). For example, according to one embodiment, titania that is covalently or ionically bonded to a nano-optoelectronic member 120 can exhibit suitable photocatalytic properties. Furthermore, in other embodiments, the photocatlytic properties of titania can be altered by being doped by different materials other than nitrogen doping.

FIGS. 4A-4B illustrate an example test environment in which consistent light emissions were observed upon low velocity impact of a test composite structure having TL sensors dispersed at an approximate 6% concentration. Light can be seen propagating along the failure path in both figures. FIG. 4A illustrates a photograph 400 of a test composite structure during a low velocity impact. The more central area is the point of impact 410, while the mushrooming area traveling to the top edge of the composite structure is the path of delamination 420. FIG. 4B illustrates a spectral photograph 450 of the same test composite structure, which was recorded during the same low velocity impact event. The bright area is captured light emitted at the point of impact 410, as the TL sensors luminesce. As can be seen, the light emitted in FIG. 4B substantially coincides with the delamination path 420 shown in the photograph 400 of FIG. 4A. The streak of light shown in FIG. 4B was due to matrix failure and subsequent delamination. Accordingly, these tests illustrate the effectiveness of TL sensors indicating the location, the extent of matrix cracking, and/or delamination in real-time or near real-time, which can advantageously be used to provide diagnostic information to track structural damage in a structural health monitoring system, as described herein.

With continued reference to FIG. 1A, the multiple nano-optoelectronic members 120 in a material are in electrical communication with at least one terminal node 130. The one or more terminal nodes 130 facilitate signal communication 150 of the electrical signals representative of the TL sensor 110 luminescence activity to an analyzer system 140, also referred to herein as an "analyzer." Nano-optoelectronic members 120 can be attached to, or otherwise associated with, a respective terminal node 130 via a conducting material (e.g., carbon fiber, silicon, metal, metal alloy, etc.) to prevent signal loss from the nano-optoelectronic members 120 to the terminal node 130. Moreover, according to one embodiment, additional electrical circuitry may be included as part of the terminal node 130, such as, but not limited to, filters, amplifiers, and the like.

According to one embodiment, the terminal node 130 may be in wireless communication with the analyzer system 140. For example, wireless communication may be accomplished via radio frequency (RF) transmissions, such that each terminal node 130 includes a wireless RF transmitter module, and each analyzer system 140 includes a wireless RF receiver module, as are known. Other wireless communication techniques may be used, such as, but not limited to, wireless cellular communications, and the like. Wireless communication between the one or more terminal nodes 130 and the analyzer system 140 may be particularly advantageous in a local on-board structural health monitoring system operable for real-time or near real-time monitoring of the health of the structure while in operation, avoiding the need for routing and integrating wired communications from the various terminal nodes 130 and the analyzer system 140. Example on-board analyzer systems 140 may include, but are not limited to, a vehicular control system, a maintenance system, a data logging system, and the like. Wireless communication may also be advantageous in a product design and testing environment and/or maintenance environment, allowing for quick interchange between various structures equipped for TriP structural health monitoring.

In other embodiments, however, the one or more terminal nodes 130 may be in wired communication with an analyzer system 140. For example, the one or more terminal nodes 130 may have, instead of an RF transmitter, a pre-configured connector (e.g., a parallel connector, such as DB25 connector; a serial connector, such as DB9 or a USB connector; an Ethernet connector, such as an RJ45 connector, etc.) that is adapted for connecting via one or more cables or other communication lines to an analyzer system 140. Wired communications may be used in local on-board structural health monitoring systems, as well as in other environments, such as, but not limited to, testing environments, product design environments, and the like.

According to one embodiment, the one or more terminal nodes 130 are positioned at or near one or more edges of the structure 102 being monitored, whereby the nano-optoelectronic members 120 extend to or near the edge of the structure 102, and the terminal nodes 130 are integrated or otherwise affixed therewith. Positioning the terminal nodes 130 at or near the edge of a structure 102 minimizes the design considerations and possible adverse impacts on the structural integrity of the structure 102, while also providing easier access to the terminal nodes 130, such as if operable for wired communication and/or for servicing. In some embodiments, the terminal nodes 130 may be concealed, such as by a cap or other body member, to reduce the impact on design and operability (e.g., to preserve aerodynamics, styling, etc.). However, in other embodiments, one or more terminal nodes 130 may be placed at a distance from the edge of the structure 102, such as may be desired for certain applications and/or to improve accessibility.

It is appreciated that any number of terminal node 130 designs and configurations can be used, which are suitable for transmitting electrical signals from the nano-optoelectronic members 120 to the analyzer system 140, and that the above examples are provided for illustrative purposes and are not intended to be limiting.

An analyzer system 140, such as is described in more detail with reference to FIG. 7, is configured to receive and analyze electrical signals converted from the TL sensors' 110 luminescence, which are representative of an impact to the structure 102. Any number of techniques may be employed to analyze the received signals and to determine whether structural degradation and/or failure has occurred, and, if so, the magnitude and an approximate location of the degradation or failure. In example embodiments, the analyzer system 140 may analyze, among other properties, the nano-optoelectronic member 120 characteristics when transmitting electrical signals, the absorption of the nano-optoelectronic members 120, the visibility and spectral character of the nitrogen doped titania (or other photocatalyst), and/or the triboluminescence character represented by the electrical signals. Example structural analysis techniques include statistical and distributional analysis, regression analysis, group classification, outlier detection, novelty detection, predictive modeling, neural network analysis, any combinations thereof, and the like.

The approximate location of a degradation or failure occurring within a structure 102 may be determined at least partially from the known orientation of the nano-optoelectronic members 120 within the material. For example, according to one embodiment, the nano-optoelectronic members 120 may be configured in a grid or other matrix pattern so the approximate location of the nano-optoelectronic members 120 relative to the structure 102 is known. By knowing from which one or more terminal nodes 130 the signals are received, the analyzer system 140 can deduce an approximate location (e.g., mathematically calculate the intersection based on the timing and/or strength of signals received from two terminal nodes, etc.). In another example, each terminal node 130 may be associated with an approximate location in the structure. Thus, in this embodiment, every signal received via a given terminal node 130 will represent degradation or failure at or near a same location. In other embodiments, it may not be desired to determine approximate location of the degradation or failure.

A first step of the analysis in structural health monitoring includes defining the baseline or training a model of the structure 102, which is reflective of a healthy or desired state of the structure 102. Defining this baseline or model includes collecting initial state data regarding the structure's 102 health, which may be collected, for example, during production of the structure 102, while the structure 102 is in operation, while the structure 102 is dormant, or any combinations thereof. After collecting the initial state data, a model is built, which will be dependent upon the subsequent analysis techniques performed. Next, operational data is collected during the life of the structure 102 from TL sensors 110 via nano-optoelectronic members 120 and terminal nodes 130, as described above. The data may be collected while the structure 102 is in operation (e.g., for on-board, real-time monitoring, etc.), while the structure 102 is dormant (e.g., for off-line monitoring, during design, build, and/or testing, etc.), and/or while the structure 102 is undergoing testing. Finally, the received data is analyzed using one or more structural analysis techniques, which may optionally also include data cleansing, conditioning, condensing, and/or any other data preparations prior to performing the substantive analysis. It is appreciated that any known structural and data analysis techniques may be used to analyze the received data and to determine the health of a structure.

FIG. 1B illustrates an example diagrammatic depiction of a structural health monitoring system 100 in operation for monitoring the structural health of a structure. Upon the impact, failure, and/or degradation (generally referred to herein as a "failure") of material forming a structure, one or more TL sensors 110 proximate the point of failure will emit light energy 160. The light energy 160 is absorbed by one or more proximate nano-optoelectronic members 120 and converted to electrical signals 170 in the form of electrical current representative of the light energy 160 emitted due to the photocatalytic properties of the nano-optoelectronic members 120. The nano-optoelectronic members 120 then carry the electrical signals 170 to the terminal node or nodes 130 in electrical communication with the nano-optoelectronic members 120. The terminal node(s) 130 then transmits (e.g., wired or wireless) the electrical signals to the analyzer system 140 for analysis and output regarding the structural health.

FIG. 5 provides an example detailed illustration of material 510 incorporating a TriP structural health monitoring system, according to one embodiment. The material 510 is illustrated as a composite, such as a fiber-based composite (e.g., carbon fiber composite, etc.) within which multiple TL sensors are dispersed. The material 510 further includes an array of nano-optoelectronic members 120, which are shown as nano-optoelectronic rods 520 that are combined with nitrogen doped titania and extruded within a polymer, such as polymethyl methacrylate, for example. FIG. 5 also illustrates one or more terminal nodes 130 formed at the edges of the structure, each in electrical communication with one or more of the nano-optoelectronic rods 520 dispersed throughout the composite material 510, for providing signal transmission to an analyzer or other signal processing system.

It is appreciated that the embodiment shown in FIG. 5 is provided for illustrative purposes only. In other embodiments, one or more nano-optoelectronic members may be adhered onto the surface of a structure being monitored, such as when used to monitor metallic materials, for example. For example, TL sensors and nano-optoelectronic members may be dispersed within a suitable medium used as a surface coating (e.g., paint, clear coat, etc.), or may be positioned on the surface and then secured to the surface by a subsequent coating. Any suitable coating may be used that would not alter the characteristics of the TL sensors and that could adhere to the structure being monitored, while not degrading performance or otherwise altering the qualities required for the structure or the overall product in which the structure is being used.

FIG. 6 illustrates a TriP structural health monitoring system 600 integrated with an aircraft body 610, according to one example embodiment. In this example, the aircraft body 610 is constructed from a structure 620 of composite laminates, such as carbon fiber reinforced composite laminate, such as is described with reference to FIGS. 1A-1B and 5. For example, the composite structure 620 may include an array of nano-optoelectronic rods 630, which may be formed from nanotubes and/or nanofibers 640 combined with nitrogen doped titania, as described herein, and dispersed within the composite structure 620. The nano-optoelectronic rods 630 may be oriented within the composite structure 620 as structured arrays, as random arrays, or as a combination of both. The nano-optoelectronic rods 630 are in signal communication with an analyzer system 140, such as via one or more terminal nodes. The analyzer system 140 may be on-board and provide real-time or near real-time analysis, also as described herein. Accordingly, in operation, the aircraft body 610, being formed from composite structure 620 having an integrated structural health monitoring system, can undergo structural health monitoring while in operation and without decommissioning or otherwise removing the aircraft 610 from operation.

FIG. 7 illustrates a block diagram of an example analyzer system 140, such as is described with reference to FIGS. 1A-1B and 6, which may be used to at least partially carry out the structural health monitoring data analysis, and optionally the data gathering, conditioning, and baseline model designations for a given structure. Each analyzer system 140 may include a memory 705 that stores programmed logic 715, for example the analyzer logic and associated baseline data and/or models described above with reference to FIG. 1A, and may store data 720, such as light energy emissions measurements, structural data, composition data, historical structural data, variances, ranges, safety data, baseline data and parameters, historical data, and the like. The memory 705 also may include an operating system 725. A processor 710 may utilize the operating system 725 to execute the programmed logic 715, and in doing so, also may utilize the data 720. A data bus 730 may provide communication between the memory 705 and the processor 710. Users may interface with the analyzer system 140 via a user interface device(s) 760, such as a keyboard, control panel, mouse, audio input, or any other devices capable of communicating data to and from the analyzer system 140. The analyzer system 140 may be in signal communication (e.g., wired or wireless) with one or more terminal nodes, which are in electrical communication with one or more nano-optoelectronic members, such as is described in detail with reference to FIG. 1A. Moreover, in some embodiments, an analyzer system 140 may be in communication with one or more other analyzer systems, such as for accessing distributed data and/or distributing processing and/or providing redundant processing or coordinated analysis, and/or with other data analysis systems, such as a main or central system in communication with multiple analyzer systems. The analyzer system 140 also may be in communication with other systems associated with or operating on the structure being monitored (e.g., a vehicular control system, data logging system, etc.). The analyzer system 140 may utilize one or more input/output (I/O) interfaces 735 to directly communicate with one or more other systems or may communicate over a network, such as the Internet, a local area network, a public network, a private network, a wireless network, and the like. Other known components may be included with an analyzer system 140, as desired.

FIG. 8 illustrates one example method 800 for monitoring the structural health of a structure, such as by using a TriP structural health monitoring system described herein, according to one embodiment. This example method 800 may be at least partially executed using an analyzer system, such as is described above.

The method 800 begins at block 810, in which a structure to be monitored is provided. The structure can be manufactured from a material having multiple TL sensors and multiple nano-optoelectronic members, as described above. The structure can be manufactured in any manner, such as is described in more detail with reference to FIGS. 1A and 5-6. The structure can be a component of a larger product, such as an aircraft, a vehicle, a building structure, and the like. In other embodiments, the structure can be a structural component or mock component used for testing during design stages of future products.

The nano-optoelectronic members can include a photocatalyst, like nitrogen doped titania, or any other photocatalyst, as described above. The photocatalyst serves to convert light energy emitted from respective TL sensors to electrical current. The electrical current is then transmitted to one or more analyzer systems, or other signal processing systems, to determine whether light energy was emitted by TL sensors and thus converted by the nano-optoelectronic members proximate one or more TL sensors.

In one embodiment, steps of providing the structure may further include manufacturing the structure to be monitored, such as is described and understood with respect to various embodiments herein.

Following block 810 is block 820, in which at least one analyzer system in signal communication (e.g., wireless or wired) with one or more of the nano-optoelectronic members is provided. The analyzer system may be any computer- or processor-based system, such as is described with reference to FIGS. 1A and 7.

Following block 820 is block 830, in which the analyzer system can receive at least one signal from one or more of the nano-optoelectronic members via the terminal node. The signal is an electrical current representative of light energy emitted from one or more of the TL sensors when impacted. For example, upon a change in the structure's integrity, the TL sensor or sensors near the affected site may emit a light, which is converted by photocatalysis to an electronic signal via one or more nano-optoelectronic members proximate the TL sensor(s).

Following block 830 is block 840, in which the analyzer system can process signals transmitted by the nano-optoelectronic members. For example, the analyzer system may perform signal processing on the signals received to detect changes or other fluctuations that may represent light emitted by one or more TL sensors.

At block 850, the analyzer system can analyze the results of the processed signals to determine whether an area of the structure suffered structural failure. Analysis can be performed by any algorithmic, signal processing, mathematical processing, mathematical transforms, statistical processing, rules-based processing, learning-based processing, and the like.

In some embodiments, the analyzer system may be operable to perform real-time or near real-time processing and determinations, such as if the analyzer is part of an on-board monitoring or control system (e.g., in an aircraft monitoring system) or if being performed during materials and/or structural testing or design. In other embodiments, however, the analyzer system may additionally, or instead, store results for off-line processing, such as to collect data for subsequent analysis.

Following block 850 is optional block 860, in which the analyzer system or some other system and/or operator may perform one or more actions responsive to the results of the data analysis and to determining that there is structural failure or degradation. In various embodiments, the analyzer system may generate and transmit one or more control signals to other control systems or analyzer systems or other control and/or reporting systems, may generate one or more alarm signals, may record the results in a memory, may halt the operation of the associated structure, may adjust design parameters, and/or perform any combination thereof.

The method 800 may end after block 860, having performed structural health monitoring and analysis using a TriP structural health monitoring system incorporating TL sensors and nano-optoelectronic members, according to one embodiment.

In one embodiment, a TriP structural health monitoring system like that described herein can monitor structures from "cradle-to-grave," such as starting from the time of manufacture, prior to assembly of the monitored structure with the other elements, and continuing through complete assembly and during use of the structure in its assembled end product. Though, in other embodiments, a TriP structural health monitoring system may be used to monitor a given material's structure only at one or more stages of the monitored material's life cycle. Historical data obtained from the TL sensors through the different stages and during their use can be used not only to monitor given structures, but also to contribute data useful in making future product design decisions, such as indicating weaknesses in structural integrity or of materials being used. For example, data collected from a TriP structural health monitoring system used in existing vehicle and/or vehicle production can also be used to aid in improved designs for next-generation vehicles.

Throughout this description, the aircraft industry and aircrafts are used as example structures, products, and processes to which a TriP structural health monitoring system may be applied; however, any structure may be monitored, and a TriP structural health monitoring system has value in any number of industries and processes.

Various embodiments are described above with reference to block diagrams and schematic illustrations of methods and systems. It will be understood that each block of the diagrams and combinations of blocks in the diagrams can be implemented by computer program instructions. These computer program instructions may be loaded onto one or more general purpose computers, special purpose computers, or other programmable data processing apparatus to produce machines, such as an analyzer described herein, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce a special purpose machine and an article of manufacture including instruction means that implement the function specified in the block or blocks.

Many modifications and other embodiments related to that described herein will be apparent having the benefit of the teachings presented in the foregoing descriptions and the associated drawings. Therefore, it is to be understood that the subject matter described herein is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for monitoring the structural health of a structure, comprising:
providing a structure comprising a material comprising a plurality of triboluminescent sensors and a plurality of nano-optoelectronic members comprising a photocatalyst, wherein the plurality of nano-optoelectronic members is operable to convert light energy emitted from proximate triboluminescent sensors into one or more electrical signals and wherein the plurality of nano-optoelectronic members is provided in or on the structure in an array configuration within the material;
providing at least one analyzer in signal communication with one or more of the plurality of nano-optoelectronic members; and
receiving at least one electrical signal at the analyzer from one or more of the plurality of nano-optoelectronic members, wherein the at least one electrical signal is converted by the one or more of the plurality of nano-optoelectronic members from light energy emitted from one or more proximate triboluminescent sensors.

2. The method of claim 1, further comprising determining that the material at or near the one or more triboluminescent sensors that emitted light energy suffered structural failure or degradation based at least in part on analyzing the at least one electrical signal received at the analyzer.

3. The method of claim 2, wherein determining that the material at or near the one or more triboluminescent sensors that emitted light energy suffered structural failure or degradation is performed in real-time or near real-time.

4. The method of claim 2, wherein analyzing the at least one electrical signal received at the analyzer comprises determining at least one of: (a) a relative strength of structural failure or degradation, (b) a relative luminescence intensity, or (c) an approximate location of the one or more triboluminescent sensors within the structure.

5. The method of claim 1, wherein the at least one analyzer is in wireless signal communication with the one or more of the plurality of nano-optoelectronic members, and wherein receiving the at least one electrical signal at the analyzer comprises receiving the at least one electrical signal wirelessly at the analyzer.

6. The method of claim 1, wherein providing the structure comprising the material comprising the plurality of triboluminescent sensors and the plurality of nano-optoelectronic members comprises dispersing the plurality of triboluminescent sensors and the plurality of nano-optoelectronic members in a resin.

7. The method of claim 1, wherein the material comprises one of: (a) a composite material; (b) concrete; or (c) a surface coating material.

8. The method of claim 1, further comprising adjusting at least one design parameter of another structure based at least in part on the determinations performed by the analyzer.

9. A structural health monitoring system, comprising:
a structure to be monitored, the structure comprising a material comprising a plurality of triboluminescent sensors and a plurality of nano-optoelectronic members comprising a photocatalyst, wherein the plurality of nano-optoelectronic members is provided in or on the structure in an array configuration within the material; and
an analyzer in signal communication with the plurality of nano-optoelectronic members.

10. The structural health monitoring system of claim 9, wherein the plurality of triboluminescent sensors comprises triboluminescent crystals.

11. The structural health monitoring system of claim 9, wherein the plurality of triboluminescent sensors comprises at least one of: (a) Zinc sulfide manganese; (b) Zinc sulphide; (c) a Terbium compound; (d) a Europium compound; (e) a Samarium compound; or (f) Barium.

12. The structural health monitoring system of claim 9, wherein at least a portion of the plurality of triboluminescent sensors is randomly dispersed in the material.

13. The structural health monitoring system of claim 9, wherein the plurality of nano-optoelectronic members comprises titania.

14. The structural health monitoring system of claim 9, wherein the plurality of nano-optoelectronic members comprises nitrogen doped titania.

15. The structural health monitoring system of claim 9, wherein the plurality of nano-optoelectronic members comprises at least one of: (a) a plurality of nano-optoelectronic rods; or (b) a nano-optoelectronic film.

16. The structural health monitoring system of claim 9, wherein the analyzer is in wireless signal communication with the plurality of nano-optoelectronic members.

17. The structural health monitoring system of claim 9, wherein the material further comprises at least one terminal node in electrical communication with at least a portion of the plurality of nano-optoelectronic members and in signal communication with the analyzer.

18. The structural health monitoring system of claim 17, wherein the at least one terminal node is located proximate an edge of the material.

19. The structural health monitoring system of claim 17, wherein the at least one terminal node further comprises at least one wireless transmitter operable for wireless communication with the analyzer.

20. The structural health monitoring system of claim 9, wherein the analyzer comprises one of: (a) a local monitoring system provided on or associated with the structure; or (b) a remote monitoring system located remote from the structure.

21. A structure capable of being monitored, comprising:
a plurality of triboluminescent sensors embedded in a material; and
a plurality of nano-optoelectronic members comprising a photocatalyst embedded in the material in an array configuration within the material, wherein the plurality of nano-optoelectronic members is operable to convert light energy emitted from respective triboluminescent sensors into electrical signals, and wherein the plurality of nano-optoelectronic members is operable for signal communication with an analyzer.

* * * * *